Sept. 14, 1965  S. B. McFARLANE  3,206,343
METHOD OF PILE CONSTRUCTION
Filed Dec. 23, 1958  2 Sheets-Sheet 1

Sept. 14, 1965    S. B. McFARLANE    3,206,343
METHOD OF PILE CONSTRUCTION
Filed Dec. 23, 1958    2 Sheets-Sheet 2

3,206,343
METHOD OF PILE CONSTRUCTION
Samuel B. McFarlane, Summit, N.J., assignor to Celanese Corporation of America, New York, N.Y., a corporation of Delaware
Filed Dec. 23, 1958, Ser. No. 782,534
4 Claims. (Cl. 156—72)

This invention relates to a pile construction such as a carpet comprising a pile anchored to a backing of foamed synthetic elastomer, said construction being prepared by treating a pile material with a foaming composition which produces a flexible elastomeric foam.

The liquid foaming composition which is employed in accordance with the invention is contacted with the pile. Foaming occurs to increase the thickness of the composition from its initial value of about $\frac{1}{32}-\frac{1}{16}$ inch for the liquid to about $\frac{1}{8}-1$ inch for the solid foam, the pile becoming embedded in the foam.

In accordance with one aspect of the present invention the foaming composition is a polyurethane, i.e. the reaction product of a polyisocyanate, preferably a diisocyanate, and a polyhydric alcohol. Foaming may be produced due to generation of a gas in the reaction such as by addition of water to the reaction mass of di-isocyanate and polyhydric alcohol, the water reacting with isocyanate radicals to generate carbon dioxide.

Representative diisocyanates include aliphatic di-isocyanates such as ethylene di-isocyanate, propylene di-isocyanate, butylene di-isocyanate, hexamethylene di-isosyanate, and the like although aromatic di-isocyanates are preferred because of cost and availability, e.g. toluene 2-4-di-isocyanate, m-phenylene-di-isocyanate, 1-chloro-phenylene-2, 4-di-isocyanate, xylene-4, 4-di-isocyanate, naphthalene-1, 5-di-isocyanate, 4, 4'-diphenylmethane-di-isocyanate, and the like.

The di-isocyanate is reacted with the polyhydric alcohol in amount sufficient to provide an excess of isocyanate radicals per hydroxy group, e.g. about 1.5–4 isocyanate groups per hydroxy group. The polyhydric alcohol is preferably a polymer and preferably has a molecular weight of about 1000 to 3000. Representative higher molecular weight polyhydric alcohols include polyalkylene glycols, castor oil, polyesters produced by reacting polycarboxylic acids such as adipic or phthalic acid with one or more alcohols such as diethylene glycol, trimethylol propane, glycerine, pentaethritol or hexanetriol, there being an excess of hydroxy groups over the carboxyl groups of the polycarboxylic acid. The reaction can be effected merely by mixing the diisocyanate, polyhydric alcohol and water. Alternatively, the diisocyanate may be pre-reacted with all or part of the polyhydric alcohol at about 75 to 100° C. for about 0.5 to 2 hours and water, catalyst and emulsifier are added to the cooled pre-polymer to produce the foam.

When foaming is to be effected by reaction of water with isocyanate radicals, the isocyanate radicals should be present in excess over the hydroxy groups of the polyhydric alcohol, as noted. The water should be added in amount sufficient to react with the excess isocyanate radicals and preferably in excess, e.g. about 10% over the amount necessary to react with the theoretical excess of isocyanate radicals over hydroxy groups.

In preparing uniform blown elastomeric sponges, it is often desirable to thin the isocyanate reaction mixture with a small amount of selected miscible solvent unreactive with isocyanate such as acetone or dioxane to permit uniform distribution of the intermediate in the water added subsequently.

In place of the preferred polyurethane foams described herein, other foams can be substituted as the integral anchor and padding for the pile, e.g. vinyl, modified styrene foams, both natural and synthetic latex foams, and the like. The polyurethane foams are preferred, however, because they can be foamed in place.

Additives such as fillers, extenders, modifiers, etc., may also be incorporated in minor amounts into the foaming elastomer liquid to thicken the foaming composition. Such products include magnesium carbonate, powdered wood, cellulose, bentonite, silicon dioxide, calcium silicate, glass fiber, magnesium stearate and the like. Aluminum stearate as an additive aids in the formation of small uniform unconnected cell structures. The above additives serve to thicken the elastomeric foaming composition to provide paste-like liquids. Dispersing agents can also be present to make the foam uniform. Because of the viscosity of the composition it creeps along the pile, by capillarity, only to a small extent. When using a polyurethane foaming composition as opposed to a pre-formed foam such as it is produced by whipping air into a rubber latex, the foaming is substantially completed shortly after addition of the water, e.g. about 10 seconds to 2 minutes, although the mass is advantageously left standing at room temperature for up to about 10 minutes to become sufficiently strong to be handled without collapsing. The boundaries of the foamed mass, i.e. the upper pile surface, the bottom and the sides, have a thin flexible skin which resists peneration by dirt, which provides a smooth, non-brittle skin for the base of the pile construction and which is adapted to grip the surface of wooden or cement floors by virtue of its smooth, pliable, elastomeric surface characteristics. When using the preferred polyurethane foaming composition, the resulting elastomeric flexible foam has a density of about 1 to 10 and preferably about 4 pounds per cubic foot, the foam being characterized by a uniform small cell structure a few millimeters in diameter.

By the foregoing procedure of the invention, a floor covering is produced in which the lengthy and costly conventional procedures of weaving, loop-cutting, backing and padding are bypassed and both carpet and pad are combined in one integral configuration, the length of the pile being the same as in conventional carpeting and the pad varying from $\frac{1}{8}$ inch up to 1 inch or more as desired.

The extent to which the foaming composition migrates up the pile by capillarity after it is applied to the fiber mass is governed by the compactness of the pile, by the viscosity of the composition, the length of time for the composition to set to a non-migrating solid form, the number and size of the gas bubbles and the like.

A procedure which may be employed to limit the penetration of the foaming composition is to place on that surface of the pile to which the foaming composition is to be applied a blocking sheet of limited permeability such as a sheet of woven or non-woven fibrous material, e.g., cotton, synthetic fabric or paper. Upon subsequent application of the foaming composition it is absorbed by the sheet which thereby limits the extent to which the composition creeps along the pile. The sheet of fabric also serves to reinforce the elastomeric spong backing and the pile.

For the pile yarns, there can be employed fibers such as silk, wool, casein, soya-bean protein and other proteinaceous fibers and fiber-forming condensation polymers such as nylon; fiber-forming condensation polymers such as copolymers of vinyl chloride wtih vinyl acetate, with vinylidene chloride or with acrylonitrile, or of acryonitrile with methacrylonitrile, linear polyesters such as polyethylene terephthalate; and the like.

Especially useful are polymeric materials containing free hydroxy groups such as the cellulosics, e.g. cotton, rayon and especially the organic acid esters of cellulose such as cellulose acetate, cellulose propionate, cellulose butyrate, cellulose acetate propionate, cellulose acetate butyrate and the like. While such esters in preparation are usually ripened to increase the number of free hydoxy groups, even the unripened esters referred to as cellulose tri-esters will contain some free hydroxy groups, e.g. up to about 0.29 free hydroxy groups per anhydroglucose unit. The hydroxy groups of these filaments react with the di-isocyanate and accordingly a chemical bond is formed between the pile and padding in addition to the physical or mechanical bond.

Further aspects of the invention will appear from the drawing which illustrates several embodiments of the invention by way of example.

In order to fabricate the structure shown in FIG. 1, the staple fibers 10 are gathered into a compact bundle and a foaming composition 11 (as described hereinbefore and as illustratively set forth in the following examples) is applied to the staple fiiber ends in an upwardly tapered box-shaped form 12 the sides of which extend above the ends of staple fibers 10 to permit the foaming composition to each maximum volume. The form 12 and fibers 10 rest on a surface 13.

Figure 2:
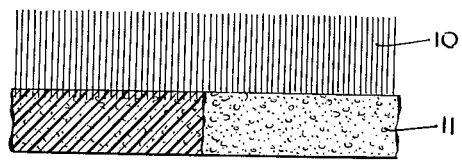
FIG. 2 is a schematic cross-section through the product resulting after the foaming of the compacted staple fiber construction of FIG. 1.

After foaming is completed and the product is removed from the form it has the configuration shown in FIG. 2. It will be noted that due to capillarity the top of the resulting solid form padding extends above bottom of the fibers.

Figure 3:
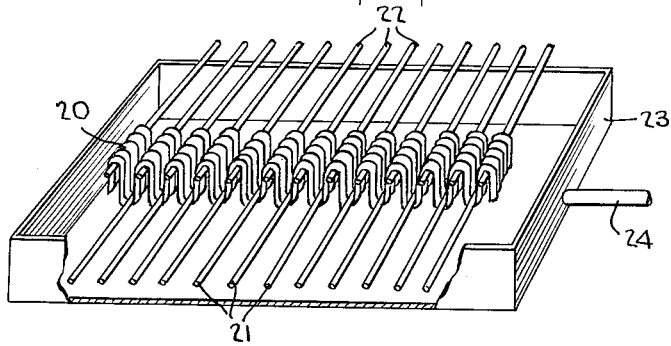
FIG. 3 is a schematic perspective view of an apparatus for embedding a looped end pile in a foaming composition acording to the invention.
Figure 4:
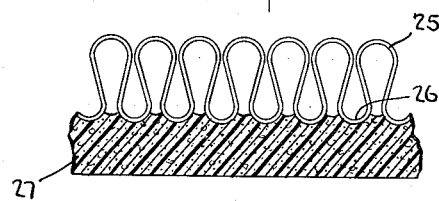
FIG. 4 is a schematic cross-section through the formed product produced as shown in FIG. 3.

In FIG. 3 there is shown another embodiment of the invention wherein the pile is composed of a plurality of parallel yarns 20, each running from left to right. The yarns 20 are all distorted into sinusoidal configurations by means of alternating rods 21, 22 respectively defining troughs and peaks. The troughs are about three-eighths inch above the bottom of open pan 23 into which a foaming composition before foaming fills the pan 23 to a height of one-eighth inch and after foaming to a height of half-inch. Rods 21, formed of a non-adherent material such as a fluoro-chloro-carbon polymer, are removed along with rods 22 and the product, shown in FIG. 4 is removed from the trough. The pile may be left looped or the loops 25 may be cut; in either event the bottoms 26 of the loops will be bonded to the foamed backing 27.

Figure 1:
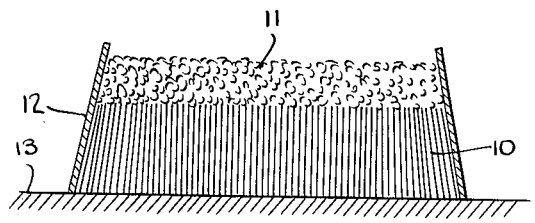
FIG. 1 is a schematic cross-section through a portion of a compacted mass of staple fiber illustrating the application of the elastomeric foaming composition to the staple fiber ends.
Figure 5:
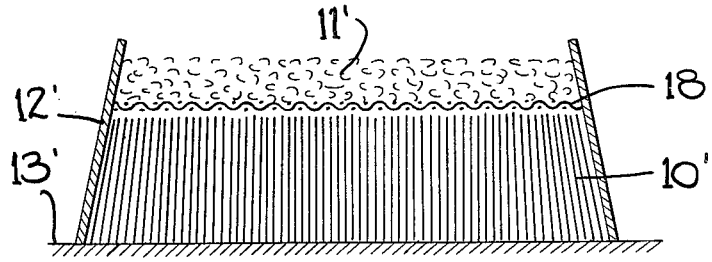
FIGURES 5 and 6 are similar to FIGURES 1 and 2 except that they show a blocking and reinforcing sheet of fabric at the base of the compacted staple fiber mass and embedded in the elastomeric composition.
Figure 6:
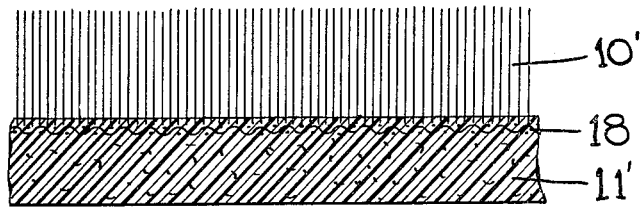

Referring now to FIGURE 5, wherein numerals 10′ to 13′ correspond to numerals 10 to 13 of FIGURE 1, blocking and reinforcing sheet of fabric 18 is laid over one face of the mass of staple fibers 10′ located in tapered form 12′ prior to the application of foaming composition 11′. After the application and hardening of the foaming composition, the resulting structure is shown in FIGURE 6, wherein fabric 18 is embedded in the elastomeric composition 11′ just below the ends of staple fibers 10′.

Figure 7:
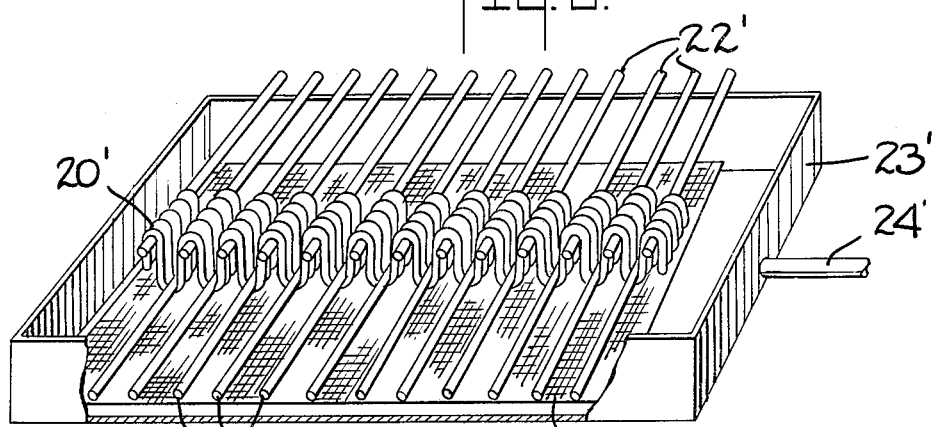
FIGURES 7 and 8 are similar to FIGURES 3 and 4 except that they show the application and position of a blocking and reinforcing sheet at the base of the looped pile.
Figure 8:
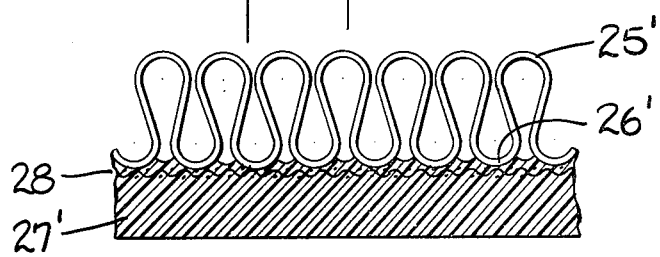

In FIGURE 7, numerals 20′ to 24′ correspond to numerals 20 to 24 in FIGURE 3. Blocking and reinforcing fabric 28 is laid on the surface of the foaming composition in open pan 23′ prior to the application of yarns 20′ secured on alternating rods 21′ and 22′. After foaming and the removal of rods 21′ and 22′, the resulting structure is shown in FIGURE 8 wherein fabric 28 is seen to be embedded in foam backing 27 adjacent to the bottoms 26′ of the looped pile.

The following example illustrates the practice of the invention. All parts are by weight unless otherwise specified.

*Example*

A polyester resin having a hydroxyl number of 70, an acid number of 2, a viscosity of 15,000 centipoises and a molecular weight of about 2000 is made in conventional manner by reacting 6.2 moles of adipic acid with 6.8 moles of diethylene glycol and 0.3 mole of trimethylol propane. 234.2 grams of the polyester are mixed with 2.7 grams of water, 2.4 grams of N-methyl morpholine and 4.2 grams of the condensation product of ethylene oxide and sorbitan as a non-ionic emulsifier. To the homogeneous blend 56.4 grams of tolylene di-isocyanate are added (80% 2,4-isomer and 20% 2,6-isomer) and after 30 seconds of mixing the mass is poured over the top of a bundle of 3 denier cellulose acetate fibers, there being about 600,000 filaments per square inch of the bundle. The foam reaches a maximum rise in about 2 minutes and is allowed to set to tack-free state in about 20 minutes. The assembly is cured for 2 hours at 150° F. to produce a high, soft, resilient pile carpet sample in which the fibers extend about ⅛ inch into the integral foam padding.

It is to be understood that the foregoing detailed description is merely given by way of illustration and that many variations may be made therein without departing from the spirit of my invention.

Having described my invention, what I desire to secure by Letters Patent is:

1. The method for making a carpet pile construction which comprises positioning a textile sheet over a plurality of discrete cellulose filaments containing free hydroxy groups, applying a viscous foaming composition to said textile sheet, said foaming composition comprising a mixture of a polyhydroxy-containing polymer, a diisocyanate in an amount sufficient to provide an excess of isocyanate groups over the hydroxy groups, and water in an amount sufficient to react with the excess isocyanate groups, and contacting said filaments by penetrating said sheet, and allowing said composition to set to a foamed flexible backing constituting an integral padding for the filaments which constitute a carpet pile, thereby embedding said textile sheet in the resulting foam.

2. The method recited in claim 1, wherein said composition is applied to one end of each of said filaments.

3. The method recited in claim 1, wherein said filaments are bent into a plurality of loops, said composition being applied to the troughs of said loops.

4. The method recited in claim 1, wherein said filaments comprises cellulose acetate.

References Cited by the Examiner

UNITED STATES PATENTS

| | | | |
|---|---|---|---|
| 2,087,260 | 7/37 | Miller. | |
| 2,187,140 | 1/40 | Faris et al. | 154—49.29 |
| 2,358,204 | 9/44 | Bird | 154—49.29 XR |
| 2,495,666 | 1/50 | Taubert | 18—59 |
| 2,567,951 | 9/51 | Lewis | 154—49.29 |
| 2,577,279 | 12/51 | Simon et al. | |
| 2,592,201 | 4/52 | Shaw | 18—59 |
| 2,707,158 | 4/55 | Van Issum. | |
| 2,725,835 | 12/55 | Mather. | |

(Other references on following page)

UNITED STATES PATENTS

| | | | |
|---|---|---|---|
| 2,738,296 | 3/56 | Runton et al. | 154—49.29 |
| 2,752,277 | 6/56 | Keen | 154—49.29 |
| 2,776,223 | 1/57 | Brown et al. | 154—76 |
| 2,784,630 | 3/57 | Kaprow. | |
| 2,792,051 | 5/57 | Jaquet | 156—72 XR |
| 2,879,197 | 3/59 | Muskat et al. | |
| 2,948,650 | 8/60 | Jackson et al. | 161—84 |
| 2,948,651 | 8/60 | Waag. | |
| 3,007,836 | 11/61 | McNamara et al. | 156—72 |
| 3,060,072 | 10/62 | Parlin et al. | 156—72 |
| 3,061,475 | 10/62 | Wallace | 156—78 XR |

FOREIGN PATENTS

| | | |
|---|---|---|
| 17,865 | 1/35 | Autralia. |
| 155,491 | 8/51 | Australia. |
| 167,675 | 9/53 | Australia. |
| 916,220 | 8/54 | Germany. |

OTHER REFERENCES

"Urethane Plastic" (pages 1383–1391, page 1388 relied on), vol. 48, No. 9, September 1956, "Industrial and Engineering Chemistry."

EARL M. BERGERT, *Primary Examiner.*

JOSEPH REBOLD, CARL F. KRAFT, R. LEIBOWITZ,
*Examiners.*